United States Patent [19]

Berdich

[11] Patent Number: 5,154,105
[45] Date of Patent: Oct. 13, 1992

[54] PICK OFF ATTACHMENT FOR AUTOMATIC MULTIPLE SPINDLE MACHINES

[75] Inventor: Boris Berdich, Northbrook, Ill.

[73] Assignee: Sloan Valve Company, Franklin Park, Ill.

[21] Appl. No.: 743,708

[22] Filed: Aug. 12, 1991

[51] Int. Cl.$^5$ .............................................. B23B 13/02
[52] U.S. Cl. .................................... 82/101; 29/38 B; 82/124; 279/155
[58] Field of Search ................. 82/101, 129, 127, 148, 82/124, 165; 29/38 B, 37 R; 279/1 E, 15, 50

[56] References Cited

U.S. PATENT DOCUMENTS

| | | | |
|---|---|---|---|
| 1,947,800 | 2/1934 | Rupple | 82/129 |
| 2,061,417 | 11/1936 | Drissner et al. | 29/37 R |
| 2,326,541 | 8/1943 | Kuehn | 29/37 R |
| 2,377,384 | 6/1945 | Slovak | 29/37 R |
| 2,577,442 | 12/1951 | Adams et al. | 29/37 R |
| 2,989,316 | 6/1961 | Perry et al. | 279/50 |
| 3,043,166 | 7/1962 | Dixon et al. | 82/125 |
| 3,176,553 | 4/1965 | Schubert | 279/4 |

Primary Examiner—Larry I. Schwartz
Assistant Examiner—Kevin J. Carroll
Attorney, Agent, or Firm—Kinzer, Plyer, Dorn, McEachran & Jambor

[57] ABSTRACT

A pick off attachment for use with automatic multiple spindle machines includes a spindle and housing to be mounted within a sliding workholder, which is moveable along the longitudinal slide of the workstation of the cutting machine. The spindle is mounted upon a splined shaft which is mechanically linked to the spindle via a collet at one end and connected to the machine gear box at the other. The shaft extends partially into the spindle where it is connected to an ejector. The face of the ejector rests inside the shoulder of another collet. This collet is mounted on the interior of the spindle and serves to hold the part to be machined during the machining cycle. Two adjustable nuts on the shaft allow the positions of the part holding collet and the ejection mechanism with respect to the part to be machined to be varied.

4 Claims, 1 Drawing Sheet

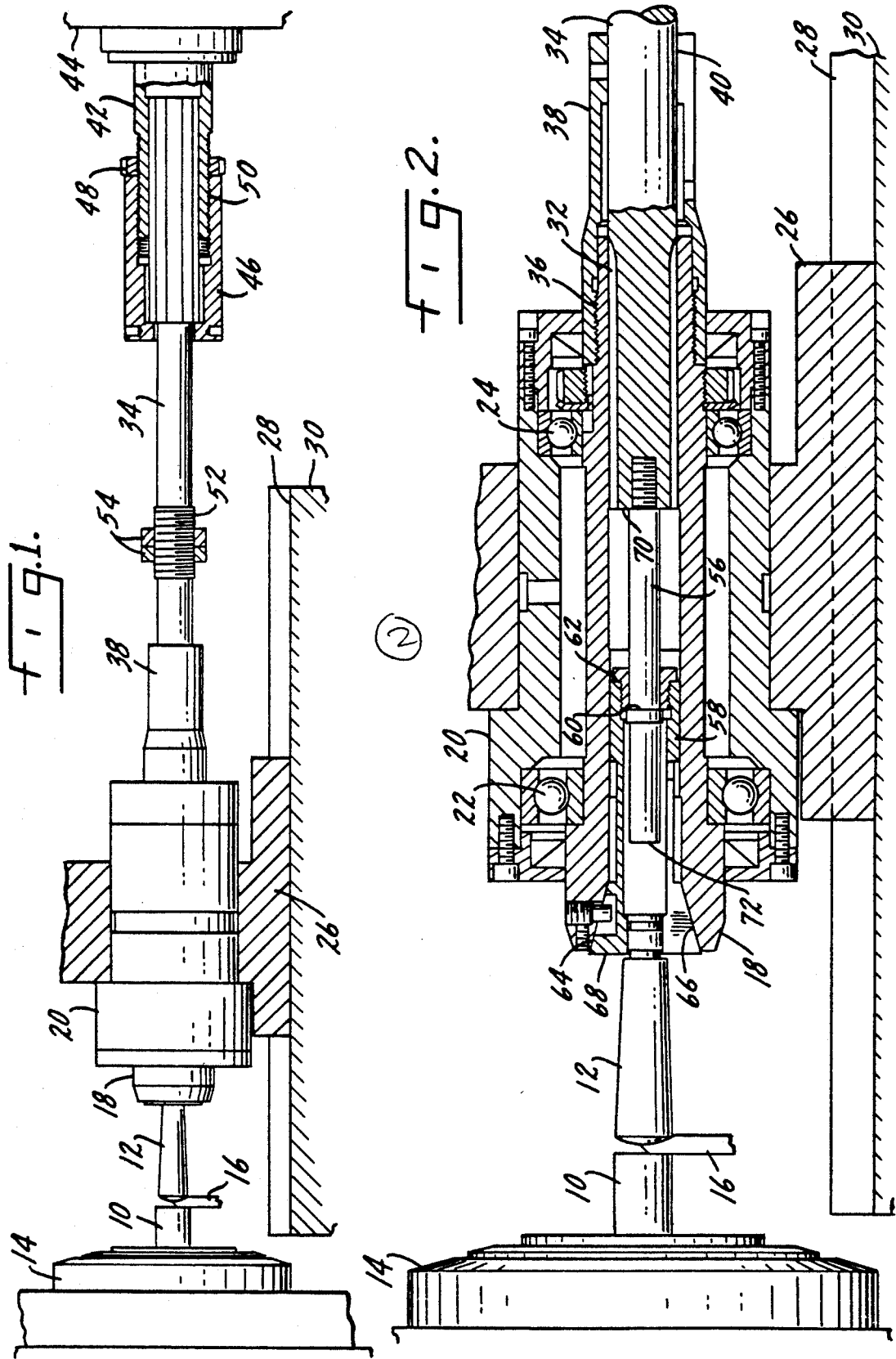

PICK OFF ATTACHMENT FOR AUTOMATIC MULTIPLE SPINDLE MACHINES

BACKGROUND OF THE INVENTION

This invention relates to a pick off attachment to be used on automatic multiple spindles and other machines having short machining cycles. It is particularly advantageous in that the required movements of the support spindle and ejection mechanisms are accomplished with only mechanical means, minimizing the cost and complexity of the attachment.

Various pick off attachments are currently available on the market. Some machine tool manufacturers such as Acme, Gridley, New Britain and others offer pick off attachments in which the required movements of the support spindle and ejection mechanisms are accomplished by means of pneumatic or hydraulic actuators. There are numerous disadvantages to such devices, specifically that the utilization of pneumatic or hydraulic actuators requires additional valves, piping and electrical boxes; that pneumatic and hydraulic actuators are impractical for use on machines with short cycle times due to the velocity limitations of such actuators; and that synchronizing attachments employing pneumatic or hydraulic actuators with the machine cycle requires the installation of additional control devices, further increasing cost.

The present invention avoids the problems of the prior art. The attachment's mechanical means of operation allows the production of "burr free" parts even when used in conjunction with a very short machine cycle. Synchronization with the machine cycle is accomplished mechanically and requires no additional control devices. The attachment may be incorporated into practically any machine without substantial machine modification.

SUMMARY OF THE INVENTION

The present invention relates to a pick off attachment for use with automatic multiple spindle machines.

A primary purpose of the invention is to enable the production of "burr free" parts by facilitating the support of the part to be machined throughout the entire machining cycle, utilizing purely mechanical means.

Another purpose of the invention is to provide mechanically controlled part ejection, regardless of part length, after machining of the part is complete.

Another purpose is to provide mechanical means to synchronize a pick off attachment with a multiple spindle machine, eliminating the need for additional control devices.

Other purposes will appear in the ensuing specification, drawings and claims.

BRIEF DESCRIPTION OF THE DRAWINGS

The invention is illustrated diagrammatically in the following drawings wherein:

FIG. 1 is a side view of a pick off attachment shown in a position of use; and

FIG. 2 is an enlarged partial axial section of the pick off attachment of FIG. 1.

DESCRIPTION OF THE PREFERRED EMBODIMENT

Looking at FIG. 1, the bar stock prior to machining is shown at 10 and a machined part which is to be cut off is indicated at 12. Part 12 is held during cut-off operations by an automatic machine spindle 14. As those skilled in the art will understand, only a portion of the automatic machine spindle is shown. The cutting tool is indicated generally at 16.

The pick off attachment consists of a spindle 18 which is supported in a housing 20 by bearings 22 and 24, as shown in FIG. 2, an axially enlarged section of the spindle part of the device. Housing 20 is mounted in a sliding workholder 26, which in turn is mounted on the longitudinal slide 28 of workstation 30.

Spindle 18 has a splined interior at 32 and is mounted there upon a splined shaft 34. Spindle 18 is also attached by threads 36 to a collet 38. Collet 38 is mounted upon and firmly grips shaft 34 at 40, thus limiting the back and forth movement of shaft 34 with respect to spindle 18. Shaft 34 extends to the far right into a splined bushing 42. Bushing 42 is mounted on machine gear box 44. An adjustment bushing 46 and locknut 48 are connected by threads 50 to the outer surface of splined bushing 42. A portion 52 of shaft 34 between collet 38 and adjustment bushing 46 is threaded and attached thereto is adjustment locknut 54.

Splined shaft 34 also extends to the left partially into the interior of spindle 18. At the far left end 70 of shaft 34 there is an ejector 56. Ejector 56 extends partially into a collet 58 such that collet 58 may move to the right over the stationary ejector 56, but such that the abutment of the shoulder 60 of the ejector 56 against the right shoulder 62 of collet 58 prevents ejector 56 from being retracted from collet 58. Collet 58 is positioned within spindle 18, with its outer surface 64 in contact with the inner surface 66 of spindle 18. The left end 68 of collet 58 extends through the leftmost opening of spindle 18, so that it may clamp and support part 12 during cut-off operations.

In use of the invention, the number of revolutions of spindle 18 is mechanically synchronized with the number of revolutions of machine spindle 14. Machine gear box 44 spins splined bushing 42 at the same rate as machine spindle 14. Accordingly, splined shaft 34 rotates at this same rate and the interconnection at 32 within spindle 18 of the splined exterior of shaft 34 and the splined interior of spindle 18 results in the synchronization of spindle 18 with the machine spindle 14. This mechanical means of synchronization is particularly important as it avoids the necessity of adding additional control devices in order to achieve synchronization.

Prior to commencing the machine cycle, the operator will first set the position of adjustment nut 54, to limit the rightward movement of shaft 34 to a desired position, and the position of adjustment bushing 46, to limit the leftward movement of shaft 34 as desired.

In a typical operation cycle of the invention, sliding workholder 26, driven by a set of auxilliary cams installed on the machine camshaft, moves toward the left along longitudinal slide 28 towards the part 12 to be cut. Consequently, spindle 18 in housing 20 is also pulled towards part 12. Shaft 34, mechanically linked to spindle 18 at 40 via collet 38, moves in unison with spindle 18 towards part 12 until adjustment bushing 46 restricts its outer movement. At such time, the mechanical link at 40 between collet 38 and shaft 34 no longer holds and shaft 34 ceases leftward movement. Spindle 18, however, continues its movement towards part 12.

At the same time that bushing 46 restricts the movement of shaft 34 ejector 56, connected to the left end 70 of shaft 34, also stops moving toward the left. The interconnection between shoulder 60 of ejector 56 and shoulder 62 of collet 58 operates to stop the leftward movement of collet 58 as well. Thus, it is seen that by adjusting bushing 46 one is ultimately determining the final position of collet 58 with respect to the part 12 to be cut.

At this point, spindle 18 is the only part of the attachment that continues to move towards part 12. Collet 58 should be at a position such that its left end 68 will be poised to constrict around part 12. As stated earlier, this position may be varied by adjusting bushing 46. As spindle 18 moves over collet 58, collet 58 is constricted around part 12. When sliding workholder 26 and thus spindle 18 cease leftward movement, collet 58 will be constricted around part 12 in such a way that it fully clamps and supports part 12 throughout the cutting cycle. This firm support of the part during the cutting cycle enables the production of "burr free" parts, thereby substantially improving parts quality and eliminating the need for secondary operations.

At the end of the cutting cycle, sliding workholder 26 begins to move the entire pick off attachment to the right along longitudinal slide 28, away from machine spindle 14. The newly cut part 12 is still firmly gripped and supported by collet 58. Collet 38 holds fast to shaft 34 at 40, so that both spindle 18 and shaft 34 move to the right until nut 54 strikes bushing 46. At such time shaft 34 and ejector 56 cease rightward movement. Collet 38, however, loses its grip on shaft 34. Accordingly, spindle 18, including collet 58 with part 12 in its grip, continues to move to the right. Note that the interaction between shoulder 60 of ejector 56 and shoulder 62 of collet 58 does not prevent collet 58 from moving rightward over the stationary ejector 56.

As spindle 18 continues to move to the right, along with collet 58 and part 12 in the collet's grip, part 12 nears the left face 72 of ejector 56. Eventually, contact is made and the link between collet 58 and part 12 is broken. Spindle 18 continues retracting over the stationary ejector 56 and part 12 until the face 72 of ejector 56 is flush with the left face 68 of collet 58. At this point, part ejection occurs. The mechanical nature of this ejection mechanism allows positive and controlled part ejection to always occur, regardless of variations in the part length. Such controlled ejection is of particular importance to the invention, as it avoids scratches and niches on the surface of the part, eliminating the need for secondary operations to correct such deficiencies.

Whereas the preferred form of the invention has been shown and described herein, it should be realized that there may be many modifications, substitutions and alterations thereto.

The embodiments of the invention in which an exclusive property or privilege is claimed are as follows:

1. A pick off attachment for use with an automatic machine spindle including:

a housing formed and adapted to be mounted in a sliding workholder movable on the longitudinal slide of a cutting tool work station, said sliding workholder being movable along the longitudinal slide, a spindle mounted within said housing and movable therewith along the spindle axis in response to sliding workholder movement, and a splined shaft mounted within said spindle, said shaft being connected to a splined bushing which is coupled to and rotated by a machine gear box;

a first mechanical clamping means mounted on said spindle for forming a mechanical link between said spindle and the splined shaft for joint spindle and shaft movement long the spindle axis in response to movement of the sliding workholder, a stop for limiting shaft movement whereby continued movement of the sliding workholder moves said spindle with respect to said shaft;

a second mechanical clamping means mounted within said spindle for clamping and supporting a part to be cut throughout a cutting cycle;

wherein said second mechanical clamping means is actuated by the movement of said spindle with respect to said shaft an injection means mounted within said spindle and in coaxial alignment with said shaft for providing controlled part ejection upon completion of said cutting cycle;

wherein said second mechanical clamping means for supporting said part to be cut consists of a part clamping collet mounted within the interior of the spindle; and wherein the position of the part clamping collet with respect to said part to be cut is variable by an adjustment bushing and locknut which are mounted upon the splined bushing at the machine gear box end of the shaft.

2. The pick off attachment of claim 1 wherein said first mechanical clamping means for mechanically linking the spindle to the shaft consists of a collet mounted on said spindle which firmly grips the shaft.

3. The pick off attachment of claim 1 wherein said ejection means comprises an ejector located within the spindle, connected at one end to the splined shaft and having an ejection face positioned within the part clamping collet at the other end, said ejection being initiated when the spindle and part clamping collet begin to retract over the stationary ejector, said retraction eventually resulting in contact between the face of the ejector and the art, with ejection occurring when the part clamping collet has been retracted past the face of the ejector.

4. The pick off attachment of claim 3 further characterized by an adjustment locknut mounted on the shaft which limits retracting movement of the shaft and ejector.

* * * * *